US009029924B2

(12) United States Patent
Xu et al.

(10) Patent No.: US 9,029,924 B2
(45) Date of Patent: May 12, 2015

(54) ANTIBLOOMING IMAGING APPARATUS, SYSTEMS, AND METHODS

(75) Inventors: Chen Xu, Alhambra, CA (US);
Gennadiy Agranov, Boise, ID (US);
Igor Karasev, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 89 days.

(21) Appl. No.: 13/351,106

(22) Filed: Jan. 16, 2012

(65) Prior Publication Data

US 2012/0119317 A1    May 17, 2012

Related U.S. Application Data

(62) Division of application No. 12/719,597, filed on Mar. 8, 2010, now Pat. No. 8,097,908, which is a division of application No. 11/605,103, filed on Nov. 28, 2006, now Pat. No. 7,675,093.

(51) Int. Cl.
*H01L 31/062*    (2012.01)
*H04N 5/3745*    (2011.01)
*H04N 5/359*    (2011.01)

(52) U.S. Cl.
CPC .......... *H04N 5/3745* (2013.01); *H04N 5/3594* (2013.01)

(58) Field of Classification Search
CPC ............ H01L 27/14609; H01L 27/14643; H01L 27/14654–27/14656; H04N 3/155; H04N 3/3574; H04N 3/3594; H04N 3/3745
USPC ............ 257/230, 292, 443, 445, E27.127, 257/E27.133
See application file for complete search history.

(56) References Cited

U.S. PATENT DOCUMENTS

| 5,311,044 A |   | 5/1994  | Iwanczyk et al. |         |
|-------------|---|---------|-----------------|---------|
| 5,404,039 A |   | 4/1995  | Watanabe        |         |
| 5,466,612 A |   | 11/1995 | Fuse et al.     |         |
| 5,471,515 A |   | 11/1995 | Fossum et al.   |         |
| 5,789,774 A |   | 8/1998  | Merrill         |         |
| 5,861,645 A | * | 1/1999  | Kudo et al.     | 257/291 |
| 6,051,447 A |   | 4/2000  | Lee et al.      |         |

(Continued)

FOREIGN PATENT DOCUMENTS

| EP | 1648160 A1 | 4/2006 |
|----|------------|--------|
| GB | 2339990    | 2/2000 |

(Continued)

OTHER PUBLICATIONS

Graeve, Thorsten, et al., "High-resolution CMOS imaging detector", Medical Imaging 2001—Physics of Medical Imaging, SPIE vol. 4320, (2001), 1-9.

(Continued)

*Primary Examiner* — Whitney T Moore
*Assistant Examiner* — Joseph Galvin, III
(74) *Attorney, Agent, or Firm* — Schwegman Lundberg & Woessner, P.A.

(57) ABSTRACT

Apparatus, systems, and methods are described to assist in reducing dark current in an active pixel sensor. In various embodiments, a potential barrier arrangement is configured to block the flow of charge carriers generated outside a photosensitive region. In various embodiments, a potential well-potential barrier arrangement is formed to direct charge carriers away from the photosensitive region during an integration time.

17 Claims, 10 Drawing Sheets

(56) References Cited

U.S. PATENT DOCUMENTS

| | | | |
|---|---|---|---|
| 6,157,053 A * | 12/2000 | Tanabe | 257/239 |
| 6,326,230 B1 * | 12/2001 | Pain et al. | 438/57 |
| 6,407,440 B1 | 6/2002 | Rhodes | |
| 6,441,409 B1 | 8/2002 | Kim | |
| 6,445,014 B1 | 9/2002 | Rhodes et al. | |
| 6,465,786 B1 | 10/2002 | Rhodes | |
| 6,504,196 B1 | 1/2003 | Rhodes | |
| 6,569,775 B1 | 5/2003 | Loewenhardt et al. | |
| 6,690,074 B1 | 2/2004 | Dierickx et al. | |
| 6,821,809 B2 * | 11/2004 | Abe et al. | 438/65 |
| 6,825,059 B2 | 11/2004 | Fossum | |
| 6,833,871 B1 | 12/2004 | Merrill et al. | |
| 6,972,794 B1 * | 12/2005 | Wang et al. | 348/302 |
| 7,002,626 B2 | 2/2006 | Pain et al. | |
| 7,247,898 B2 | 7/2007 | Dosluoglu | |
| 7,423,306 B2 * | 9/2008 | Liu et al. | 257/292 |
| 7,671,402 B2 * | 3/2010 | Kuwazawa | 257/323 |
| 7,675,093 B2 | 3/2010 | Xu et al. | |
| 7,728,277 B2 | 6/2010 | Stevens et al. | |
| 8,097,908 B2 | 1/2012 | Xu et al. | |
| 8,114,718 B2 | 2/2012 | Xu et al. | |
| 2003/0026310 A1 | 2/2003 | Valliath | |
| 2004/0239791 A1 * | 12/2004 | Mabuchi | 348/315 |
| 2005/0082582 A1 | 4/2005 | Rhodes | |
| 2005/0083421 A1 * | 4/2005 | Berezin et al. | 348/308 |
| 2005/0156213 A1 | 7/2005 | Han et al. | |
| 2005/0266597 A1 | 12/2005 | Rhodes | |
| 2006/0138488 A1 | 6/2006 | Kim | |
| 2007/0102739 A1 | 5/2007 | Chen et al. | |
| 2008/0122956 A1 | 5/2008 | Xu et al. | |
| 2010/0163933 A1 | 7/2010 | Xu et al. | |
| 2010/0219342 A1 | 9/2010 | Xu et al. | |

FOREIGN PATENT DOCUMENTS

| | | |
|---|---|---|
| WO | WO-2008066829 A2 | 6/2008 |
| WO | WO-2008066829 A3 | 6/2008 |

OTHER PUBLICATIONS

Mendis, Sunetra K., et al., "CMOS Active Pixel Image Sensors for Highly Integrated Imaging Systems", IEEE Journal of Solid-State Circuits, vol. 32, No. 2, (Feb. 1997), 187-197.

* cited by examiner

ANTIBLOOMING IMAGING APPARATUS, SYSTEMS, AND METHODS

RELATED APPLICATION

This application is a divisional of U.S. application Ser. No. 12/719,597, filed Mar. 8, 2010, now issued as U.S. Pat. No. 8,097,908, which is a divisional of U.S. application Ser. No. 11/605,103, filed Nov. 28, 2006, now issued as U.S. Pat. No. 7,675,093, both of which are incorporated herein by reference in their entirety.

TECHNICAL FIELD

The information disclosed herein relates generally to imaging technology, including image sensors and image processing.

BACKGROUND

Imaging technologies are used in a variety systems and applications, for example, automobiles, hand-held communications, defense, security and medical diagnostics. Sensors and other such structures can be manufactured from semiconductor materials, often at low cost. Moreover, the dimensions of a semiconductor sensor can be scaled to increase density and improve device performance. An active pixel sensor (APS) is one such device that can be made with light sensitive semiconductor materials. Reducing the dimensions of the APS (i.e., scaling to a smaller size) may increase pixel dark current and degrade image quality. Present APS structures may therefore be less desirable for many imaging applications.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in this document.

DETAILED DESCRIPTION

Figure 1A:
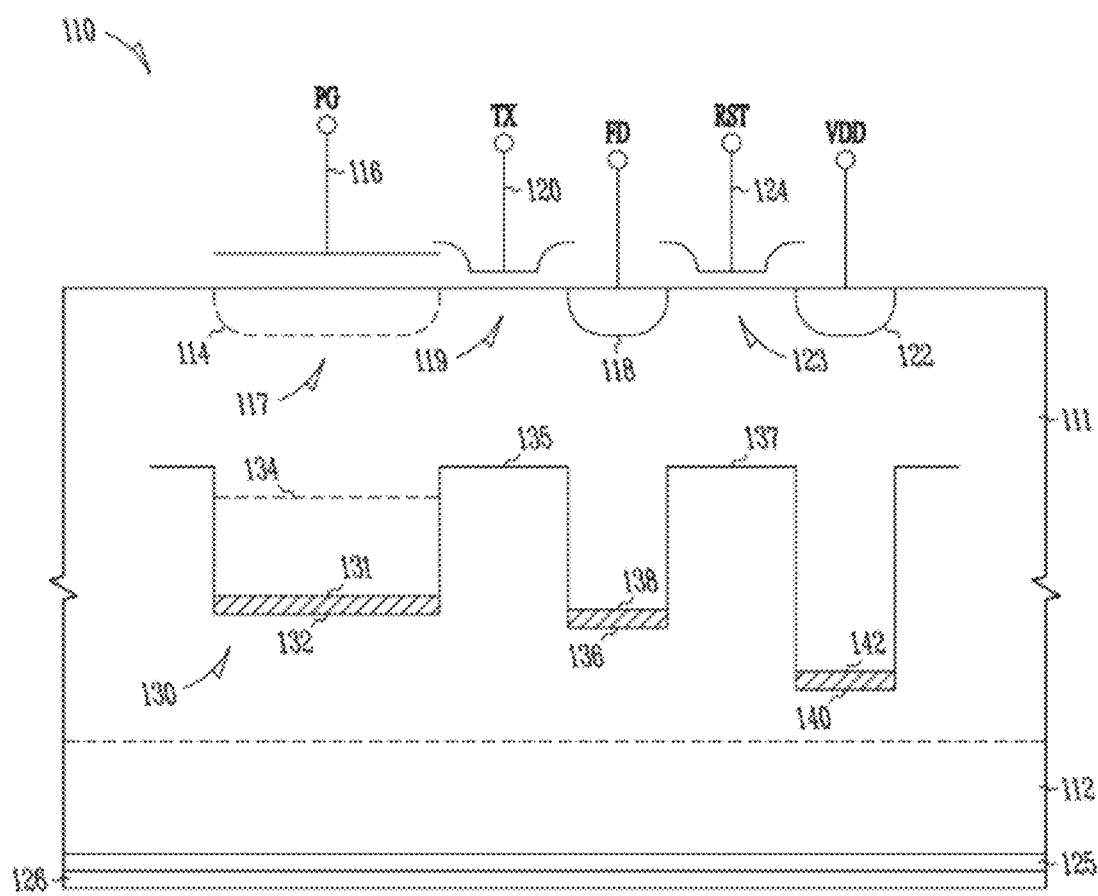
FIG. 1A-B are a schematics illustrating an APS cell and potential diagram according to various embodiments of the invention.

An imaging sensor can be made with semiconductor materials such as silicon, germanium, and gallium arsenide. Such semiconductor materials enable formation of compact and dense arrays of imaging elements in a number of shapes and sizes. Semiconductor imaging sensors may use the intrinsic properties of the semiconductor material, such as a band gap energy, to absorb and filter light from an object of interest. In a semiconductor, absorbed light may be converted to an electrical charge. The light absorption properties of semiconductor materials allow devices such as imaging sensors to be formed in layers and in various geometries. This affords the semiconductor device designer an ability to select a semiconductor material based on a particular wavelength application as well as for the ability to manipulate the light converted to electrical charge.

Light is a propagating electromagnetic wave that may be characterized as having an associated frequency or wavelength. Light may include a spectrum of wavelengths or a range of frequencies. Light may also be characterized as a stream of photon particles with an associated energy (or range of energies in the case of multi-wavelength light). Photon energy and electromagnetic wavelength may be regarded as two different ways to view light. Photon energy ($E_p$) measured in electron volts (eV) and light wavelength ($\lambda$) in measured in micrometers ($\mu m$) are related by $E_p=1.24/\lambda$. In principle then, all electromagnetic waves have an associated photon energy. The process of converting absorbed light (or photons) to charge carriers in a semiconductor is generally known as photogeneration. The associated electrical charge is known as a photogenerated charge. Photogenerated charge carriers are formed as electron-hole pairs. Photogenerated charge carriers are therefore electrons and holes with an attached charge. The efficiency (or rate) of photoconversion of absorbed light to charge carriers in a semiconductor material is directly related to the intrinsic behavior of its electronic energy band gap. The rate that charge carriers can be photogenerated in a semiconductor material, generally, depends on the difference between the photon energy of the incident light and the band gap energy of the material. In general, light with a photon energy above the band gap energy of the semiconductor material will be absorbed.

An APS is a semiconductor sensor that uses a photosensitive region to convert light to electrical charge as generally described above. An APS may include a floating diffusion region to convert charge accumulated in the photosensitive region into an output voltage. The photogenerated charge may be confined to a region of photosensitive material using a photogate or pinned photodiode to form a potential well. Increasing the density of sensor elements (pixels) in an APS means, generally, reducing the spacing between photogates. Pixel density may also be increased by reducing the pinned photodiode (or photogate) area and/or the area of the floating diffusion region. Reducing the photogate and floating diffusion region geometries may increase image noise from extraneous charge, which is a charge that may be generated in the APS cell from various sources outside the photogate region, including charge produced from errant light. The extraneous charge, however small, may be trapped by the floating diffusion region and fill the available electronic states in that region ever faster as geometries are reduced, or scaled to smaller sizes. Under certain conditions, the extraneous charge may escape the floating diffusion region and combine with the photogenerated charge stored under the photogate or in the pinned photodiode. Once the two sets of charges combine, they are not easily separated. The extraneous charge carriers as an addition to the pool of image-based photogenerated charge carriers can be considered a noise related charge. The resulting mix of image and noise related charge may be transmitted to a read circuit as single signal. The combined signal will be greater as a consequence. The transfer of the extraneous charge to the photosensitive region may therefore be regarded as a form of dark current. The resulting reconstructed electronic image may be of a lower quality. Many embodiments of the invention address the contribution of extraneous charge to the photosensitive region that can operate to increase the dark current of an APS cell.

An APS cell generally operates in one of three possible states. In the first state, light absorbed in a photosensitive region generates charge carriers for a specified time, called the "integration time" herein. The total charge generated is directly proportional to the total number of photogenerated carriers. The photogenerated charge stored in a photosensitive region may be used to reconstruct an electronic image of an object because the photogeneration rate is also proportional to the arriving photon flux.

In the second state, called the "reset state" herein, charge is removed from the floating diffusion region immediately prior to transferring the stored photogenerated charge. The reset state substantially empties the floating diffusion region of all prior transferred photogenerated charge.

In the third state, called the "read-out state" herein, the photogenerated charge gathered during the integration time in the photosensitive region may be transferred to the empty floating diffusion region. The transferred photogenerated charge filling the floating diffusion region is therefore representative of a portion of the object sensed during the integration time. Coupling the floating diffusion region to a sensing circuit allows the image-based charge to be measured (or read). Arrays of floating diffusion regions coupled to photosensitive regions may therefore be used to reconstruct a representative image of the entire object sensed during the integration time. Repeating the above processes of collecting, transferring, reading, and clearing charge allows a moving object to be imaged over time, providing a time-sequenced series of images.

FIG. 1A is a schematic illustrating an APS cell and potential diagram according to various embodiments of the invention. Here the APS cell 140 includes a photogate 116 adjacent the photosensitive region 117. The APS cell 110 may be formed in a portion of a substrate 112. The substrate 112 may be a p-type with a low carrier concentration, or an n-type with a low carrier concentration. The substrate layer 112 may be a material that includes any one or more of Si, SiC, Ge, GaAs, InP, GaN, GaP, ZnSe, and ZnS, for example. In some embodiments the substrate comprises a silicon-on-insulator layer. In various embodiments, the substrate may be a silicon-on-sapphire layer. In some embodiments, the substrate 112 may have carrier concentration near an intrinsic carrier concentration. In some embodiments, the APS cell 110 may be formed in a region, such as a doped well, with a conductivity type opposite that of the substrate 112. Doped wells may be used to electrically isolate adjacent APS cells, devices, and circuits further formed in the substrate. The APS cell 110 may be formed in a layer 111 on the substrate 112. Layer 111 may have the same or opposite type conductivity as the substrate 112. The material composition of the layer 111 may be selected according to a preferred crystal lattice spacing or substrate crystal structure. In some embodiments, the substrate may comprise a single crystal semiconductor wafer. In some embodiments, the layer 111 may be selected based on a band gap energy of a semiconductor material or a wavelength application of interest. Semiconductors that may form the layer 111 include any one or more of, without limitation, Si, SiGe, SiC, SiGeC, Ge, GaAs, AlAs, AlGaAs, InP, InGaAs, InAs, ZnSe, ZnS, GaN, GaP, AlP, AlGaP, AlAsP, GaAsP, InAsP, AlGaN, AlN, AlInAs, GaInN, GaAsN, GaPN, AlGaAsP, AlGaInAsP, and AlGaInAsPN, In some embodiments, the lattice constant of the layer 111 may be the same as the lattice constant of the substrate 112. In various embodiments, the layer 111 may be formed from combinations of Si, SiGe, SiC, SiGeC, Ge, GaAs, AlAs, AlGaAs, InP, InGaAs, InAs, ZnSe, ZnS, GaN, GaP, AlP, AlGaP, AlAsP, GaAsP, InAsP, AlGaN, AlN, AlInAs, GaInN, GaAsN, GaPN, AlGaAsP, AlGaInAsP, and AlGaInAsPN, for example.

Figure 1B:
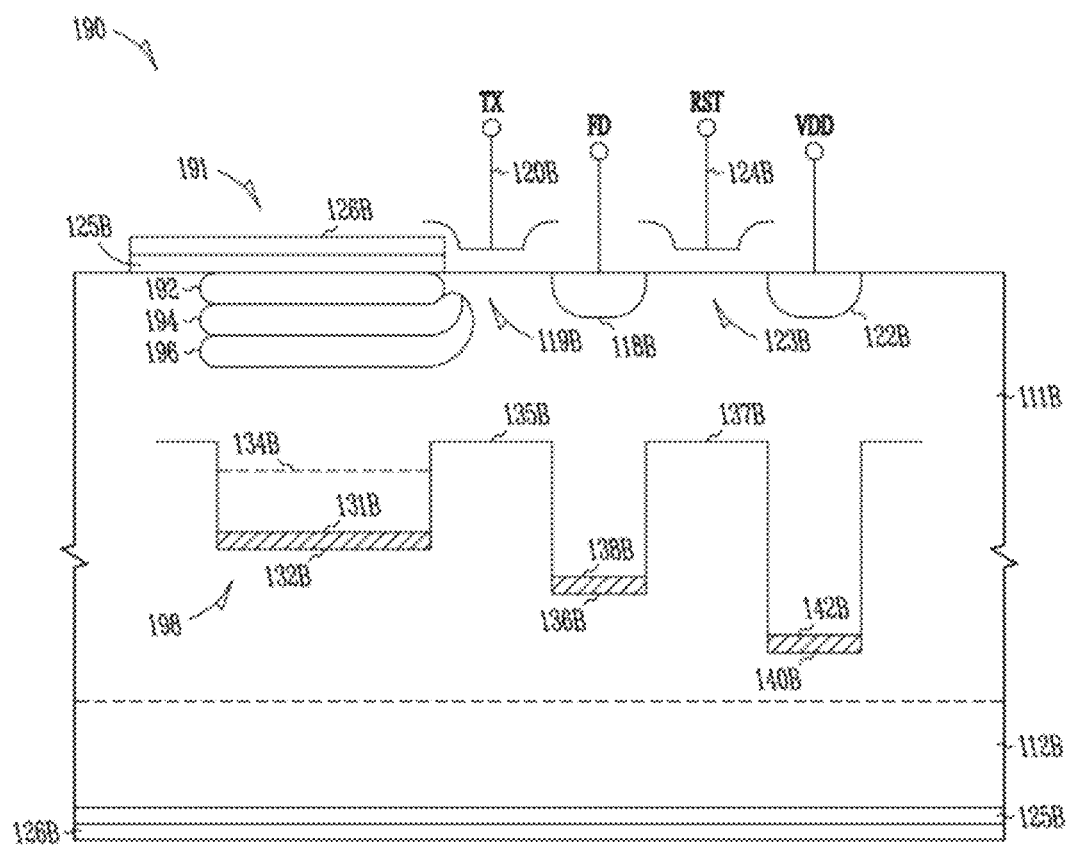

FIG. 1B is a schematic illustrating an APS cell and potential diagram according to various embodiments of the invention. Here, the APS cell 190 includes a pinned photodiode structure 191 formed in a portion of the layer 111B. In some embodiments, the pinned photodiode structure 191 may be formed in a portion of the substrate 112B. In some embodiments, the layer 111B is formed from the substrate 112B. In various embodiments, the layer 111B may be an epitaxial layer.

The pinned photodiode structure 191 may comprise a plurality of doped layers 192, 194 and 196 to form a photosensitive region that is functionally similar to the photosensitive region 117 of FIG. 1A, as will be explained below. In some embodiments, the pinned photodiode structure 191 may be formed with a p-type doped layer 192, an n-type doped layer 194, and a p-type doped layer 196. In various embodiments, the p-type doped layer 192 is a heavily doped p-type layer. In some embodiments, the pinned photodiode structure 191 may be formed with a portion of the one or more of the doped layers 192, 194 and 196 in the layer 111B and the substrate 112B. In various embodiments, the layer 196 is a doped region of layer 111B. It will be recognized by one of ordinary skill in the art that the p- and n-type impurity concentrations of the doped layers 192, 194 and 196 can be varied.

Also shown in FIG. 1B is a potential diagram 198 illustrating the respective potentials of the APS cell 190. For simplicity, only the APS cell 110 with a photogate 116 is discussed below, but one of ordinary skill in the art will recognize that the pinned photodiode structure 191 of APS cell 190 can be substituted for the photogate 116 of APS cell 110, and vice-versa, without substantially effecting the functionality of the non-photosensitive portions of the APS cell. The portions of the APS cell 190 that are similar to the APS cell 110, and its respective portions of the potential diagram 198 are assigned the same reference numbers attached to the letter B. One difference between the pinned photodiode structure-based APS cell 190 and the photogate-based APS cell 110 is the depth of the respective potential wells, 132B and 132. In general, the depth the potential well 132 with the photogate 116 can be adjusted to be greater than the depth the potential well 132B formed by the pinned photodiode structure 191. Further, it will be recognized that optional layers 125B and 126B, which correspond to optional layers 125 and 126, respectively, of FIG. 1A may be formed where front side illumination is desired.

The APS cell 110 may contain a photosensitive region 117 located under the photogate 116 (or as discussed, a photosensitive region comprising the pinned photodiode structure 191). The dimensions of the photosensitive region 117, the semiconductor material used, and the number of layers may be chosen to provide a desired absorption property. The dimensions of the photosensitive region 117, the semiconductor material used, and the number of layers may also be chosen to provide a desired photogeneration rate. In various embodiments, one or more semiconductor materials may be combined to adjust the absorption properties and charge carrier generation rate of an APS cell.

A transfer gate 120 may be formed between the photogate 116 and a floating diffusion region 118. A reset gate 124 may be formed between a drain region 122 and the floating diffusion region 118. The reset gate 124 may be formed with the one or more electrical impurities or dopant atoms included in the reset gate region 123. In various embodiments, the reset gate region 123 may include n-type dopant atoms. In some embodiments, the reset gate region 123 may include p-type dopant atoms. The floating diffusion region may be formed as an n-type doped region. The drain region 122 and the floating diffusion region 118 may be formed with the same type conductivity. In various embodiments, the floating diffusion region and the drain region may have a p-type conductivity.

Optional layer 125 may be formed as a filter layer to filter light of a desired wavelength or to filter a spectrum of light wavelengths where backside illumination is desired. In some embodiments, layer 125 may be formed as a composite material structure. In some embodiments, layer 125 may be formed as a composite of layers. Optional layer 126 is an antireflection layer that may be formed to minimize the reflection of incident light having one or more wavelengths. In some embodiments, layer 125 and layer 126 may be formed to select the wavelengths of light that will be passed through to the substrate layer 112. In various embodiments, layer 125 and layer 126 may be patterned to allow light to enter one or more regions of the APS cell 110, such as the photosensitive region 117 under the photogate. In some embodiments, a transparent photogate 116 may be used and the optional layers 125 and/or 126 may be formed between the photogate 116 and the photosensitive region 117 of the APS cell 110.

In some embodiments, the light may be selected to include a wavelength in the visible portion of the electromagnetic spectrum. In some embodiments, the light may be selected to include a wavelength in the ultraviolet portion of the electromagnetic spectrum. In some embodiments, the light may be selected to include a wavelength in the infrared portion of the electromagnetic spectrum. In some embodiments, the light may be selected to include wavelengths in the visible, ultraviolet, and infrared portion of the electromagnetic spectrum. In some embodiments, the light may be selected to include combinations of wavelengths or bands of wavelengths in the visible, ultraviolet, and infrared portion of the electromagnetic spectrum. In some embodiments, the light may be selected to include the photopic region of the electromagnetic spectrum. In some embodiments, the light may be selected to include a photon energy greater than 1.12 eV.

Also shown in FIG. 1A is an potential diagram 130 illustrating the surface potential energy along lateral portions of the APS cell 110. Light allowed to propagate through the substrate 112 may be absorbed in the photosensitive region 117. In some embodiments, the substrate may be used to form the photosensitive region. In various embodiments, the photosensitive region may comprise the substrate 112. Light absorbed in the photosensitive region 117 under the photogate 116 may be converted to charge carriers in the form of electron-hole pairs. The photogenerated charge may be stored or otherwise trapped in a potential well 132. A voltage may be applied to the photogate 116 to modulate the width of the inversion layer 114 and the potential depth of the potential well 132. The total volume of charge allowed to accumulate in the potential well 132 can be controlled by adjusting the potential depth. For example, for a fixed substrate potential a less positive photogate voltage may be used to reduce the potential depth (shown as 134), thereby lowering the volume of charge that can be stored. Conversely, the amount of photogenerated charge that can be stored may be increased by applying an increasingly negative photogate voltage.

The charge carriers accumulating in the photosensitive region potential well 132 with maximum potential level at 131 may be transferred to the floating diffusion potential well 136 by a voltage signal applied to the transfer gate 120 to lower the transfer gate potential barrier 135. The lower transfer gate potential barrier permits the accumulated photogenerated charge carriers to spill over into the floating diffusion region potential well 136. Once transferred to the potential well 136, the charge carriers lose energy and become trapped (shown, for example, as potential level 138). The floating diffusion region 118 may be coupled at terminal FD to the gate of a source follower (not shown) to transfer a potential of the floating diffusion region 118 out of the APS cell 110 where it can be measured. The transfer gate 120, therefore, may be used to electrically couple the photosensitive region 117 to the floating diffusion region 118.

The charge carriers in potential well 136 may be transferred or removed to the drain potential well 140 by a positive voltage signal to the reset gate 124 to lower the reset gate potential barrier 137. The lower reset gate potential barrier allows charge at potential level 138 in the floating diffusion region potential well to spill over to the drain potential well 140. The spilled charge may be removed at a potential level 142 to prevent accumulation of charge in the drain potential well. In various embodiments, the drain region 122 may be coupled to a fixed potential, such as $V_{AA\text{-}pix}$. The reset gate 124, therefore, may be used to electrically couple the floating diffusion region 118 to a drain region 122 that operates as a charge carrier sink (or charge drain). Therefore, the reset gate 124 and the transfer gate 120 may cooperate with the floating diffusion region 118 using a voltage signal to permit charge carriers to accumulate in the photosensitive region 117 and move about the APS cell using transfer gate region 119 and reset gate region 123. In some embodiments, the reset gate 124, transfer gate 120, and the floating diffusion regions 118 cooperate to direct charge carriers to the drain region 122. In various embodiments, the reset gate 124, transfer gate 120, and the floating diffusion regions 118 cooperate using a combination of voltage signals to adjust the barrier heights during a read-out interval to direct charge carriers to the floating diffusion region 118. In some embodiments, the reset gate 124, the transfer gate 120, and the floating diffusion region 118 cooperate to prevent charge carriers from entering the region under the photogate 116. In various embodiments, the reset gate 124 and the transfer gate 120 cooperate with the photogate 116 to reflect charge carriers away from the photosensitive region 117.

In some embodiments, the photosensitive region 117, floating diffusion region 118, transfer gate region 119, drain region 122, and reset gate region 123 may be formed from one material. In various embodiments, the photosensitive region 117, floating diffusion region 118, transfer gate region 120, drain region 122, and reset gate region 123 may be formed with combinations of different materials. Various embodiments include using combinations of semiconductor materials to provide a photosensitive region 117, a floating diffusion region 118, a transfer gate region 119, a drain region 122, and reset gate region 123 with different light absorption properties. In some embodiments, the photosensitive region 117, floating diffusion region 118, transfer gate region 120, drain region 122, and reset gate region 123 may be include a specified concentration of electrical impurities to adjust at least one of a threshold voltage, a potential level, and a potential profile. In various embodiments, the photosensitive region 117, floating diffusion region 118, transfer gate region 120, drain region 122, and reset gate region 123 support one or more dielectric layers (not shown) to adjust at least one of a threshold voltage, a potential level, a potential energy profile, and to filter light within a specified wavelength range.

The surface dimensions of the photogate 116 may range between about 0.5 μm to about 10 μm. In some embodiments, a photogate region 116 surface dimension may range between about 1 μm to about 5 μm. The surface dimensions of floating diffusion region 118 may range between about 0.05 μm to about 1 μm. In some embodiments, the floating diffusion region 118 may include a dimension ranging between about 0.1 μm to about 0.5 μm. The surface dimensions of the drain region 122 may range between about 0.05 μm to about 5 μm. In some embodiments, the drain region 122 may include a surface dimension ranging between about 0.1 μm to about 0.5 μm. The transfer gate region 119 dimensions may include a range between about 0.1 μm to about 1 μm. In some embodiments, a transfer gate region 120 dimension may be about 0.5 μm. The reset gate region 123 may include dimensions ranging between about 0.1 μm to about 1 μm. In some embodiments, a reset gate region 123 dimension may be about 0.5 μm. The vertical dimension of the photosensitive region 117 under the photogate 116 may range from about 0.05 μm to about 500 μm. In some embodiments the photosensitive region 117 may be determined by the thickness of a substrate, such as a semiconductor wafer. In various embodiments, the dimensions of the photosensitive region 117 may be determined by a dimension of a p-doped region, such as p-doped well. The floating diffusion region 118 and the drain region 122 may include a dimension extending into the layer 111 and/or the substrate 112 ranging from about 0.1 μm to about 2 μm. In some embodiments, the photogate region 116 may be formed substantially in the shape of a square, a rectangle, or a circle. In various embodiments, the floating diffusion region 118 and/or the drain region 122 may include a cross section substantially in the shape of a square, a rectangle, or a circle. In some embodiments, the floating diffusion region 118, the photogate 116, and the drain region 122 may be shaped to cooperate in the transfer of charge carriers. In some embodiments, a photosensitive region geometry may be configured to receive light based on the shape of a lens. In various embodiments, the photosensitive region geometry may be configured to receive light based on the focal length of a lens. In some embodiments, a photosensitive region geometry may be configured to receive light based on a refractive index of a lens. In various embodiments, a photosensitive region geometry may be configured to receive light based on a refractive index profile of a lens.

Figure 2A:
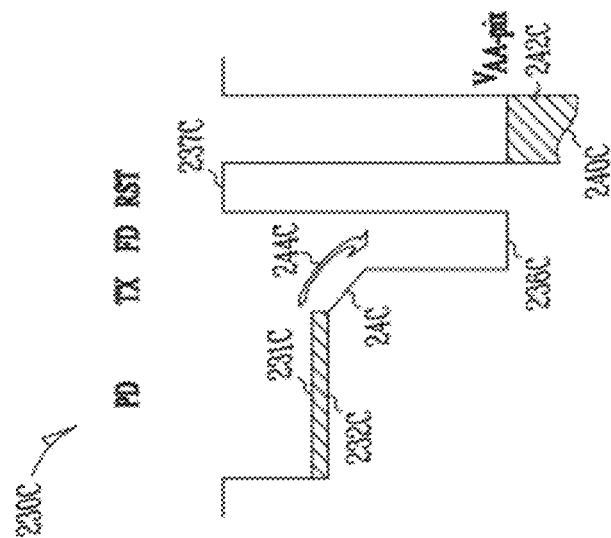
FIG. 2A-C illustrate potential diagrams of an APS cell according to various embodiments of the invention.

FIG. 2A illustrates an potential diagram of an APS cell 110 according to various embodiments of the invention. Energy diagram 230A illustrates the electronic state of an APS cell 110 during an integration time. The drain potential well 240A may be held at a low potential such that charge carriers at potential level 242B lack sufficient energy to traverse the reset gate potential barrier 237A. The drain potential well may function as sink for charge carriers to limit the potential of level 242A to at or below $V_{AA\text{-}pix}$. The floating diffusion region potential well 236A contains charge carriers at initial potential level 238A. Initial potential level 238A may exist due to a prior transfer of charge carriers from photosensitive region potential well 232A. Separating the potential well 236A from the photosensitive region potential well 232A is a transfer gate potential barrier 235A that may operate, in part, to contain the flow of the photogenerated charge carriers at potential level 231A during the integration time.

Light incident on the APS cell 110 may be absorbed in the photosensitive region 117 under the photogate 116 and converted to charge carriers. During the integration time, the photogenerated charge carriers may be allowed to accumulate at or below potential level 131. A portion of the incident light may be further absorbed in the floating diffusion region 118, the transfer gate region 119, and the reset gate region 123, thereby contributing to the extraneous charge carrier population (not shown) existing outside the photosensitive region 117.

The population of extraneous charge carriers may migrate toward and fall into the potential well 236A of the floating diffusion region under a drift electric field or by carrier diffusion. As used herein, "extraneous charge carriers" refers to charge carriers outside the photosensitive region, whether or not photogenerated, falling, migrating, scattering, diffusing, or drifting or otherwise captured in or by the floating diffusion region. The charge in the floating diffusion regions 118 can also be created by the dark current generated by the p-n junction formed from the floating diffusion region 118 and the surrounding gate regions 119 and 123. The extraneous charge, whether or not photogenerated or created by the dark current of the floating diffusion regions 118, may become trapped in potential well 236A. The capacitance associated with the floating diffusion region 118 can be small, often less than 10 fF. Therefore, accumulating extraneous charge carriers in potential well 236A may rapidly fill the available potential well to potential level 243A. At potential level 243A, the effective potential difference between potential well 236A and potential barrier 235A may be very small or even nonexistent. The lack of a potential energy difference allows the charge carriers in the floating diffusion potential well 236A to escape (shown as 245A) and scatter into the photosensitive region potential well 232A. Once transferred to potential well 232A, the extraneous charge carriers lose energy and mix with the photogenerated charge accumulating at or below potential level 231A. The same potential well that contains the photogenerated charge carriers also prevents the extraneous charge carriers from scattering back or otherwise returning to the floating diffusion region.

Figure 2B:
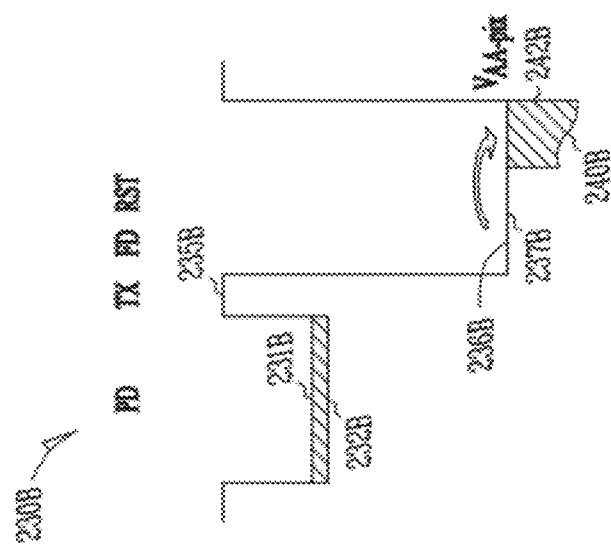

FIG. 2B illustrates an potential diagram of an APS cell 110 according to various embodiments of the invention. Energy diagram 230B illustrates the electronic state of an APS cell 110 during a reset interval. Charge carriers previously transferred from the potential well 232B to the potential well 236 across the potential barrier 235B may be removed to the drain potential well 240B by a positive control voltage signal applied to the reset gate 124 to lower the height of the potential barrier 237B (shown in a non-lowered state as 237A of FIG. 2A) to at, near, or below potential well 236B. The charge carriers in the potential well 236B that are transferred to potential well 240B at potential level 242B may be removed using voltage $V_{AA\text{-}pix}$. This reset operation substantially clears the floating diffusion region of all charge in preparation for a signal read-out operation.

Figure 2C:
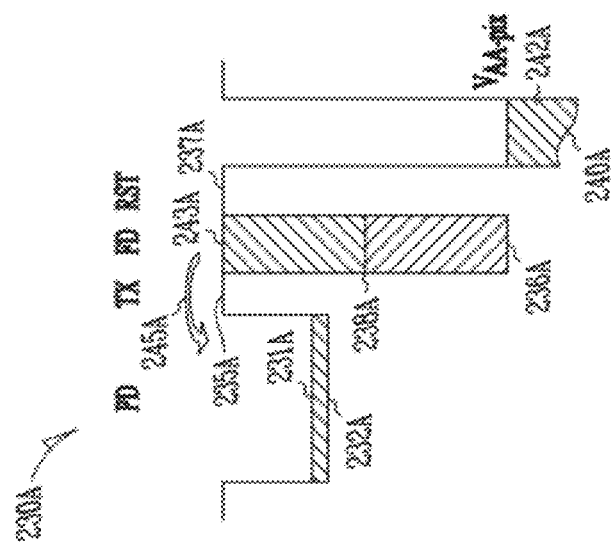

FIG. 2C illustrates an potential diagram of an APS cell 110 according to various embodiments of the invention. Energy diagram 230C illustrates the electronic state of an APS cell 110 during a signal read-out interval. Here, the reset potential barrier 237C separating potential well 236C from potential well 240C is returned to the pre-reset state by removing the positive control voltage signal from the reset gate 124. The drain potential well 240C may be at a substantially unchanged voltage level at potential level 242C using $V_{AA\text{-}pix}$. After the reset gate potential barrier 237C is substantially at equilibrium, a voltage signal may be applied to the transfer gate 120 to reduce the height of the transfer barrier potential 235C to at, near, or below potential well 232C. The loss of the potential barrier 235C allows the charge carriers (shown as 244C) to flow into the potential well 236C, substantially draining potential well 232C of the photogenerated charge carriers accumulated at or below potential level 231C. Further transfer of the photogenerated charge carriers to the drain potential well 240C is blocked by the potential barrier 237C. The floating diffusion region 118 may be further coupled to a circuit, such as a source follower (not shown) or other low noise transistor configuration, to read the voltage that is proportional to the photogenerated charge. The read charge level may be used to form an image bearing a relationship to the incident light converted to photogenerated charge carriers in the photosensitive region. Therefore, if the charge in potential well 232C includes an extraneous charge, the voltage read may contain excess signal that contributes to imaging noise.

Figure 3A:
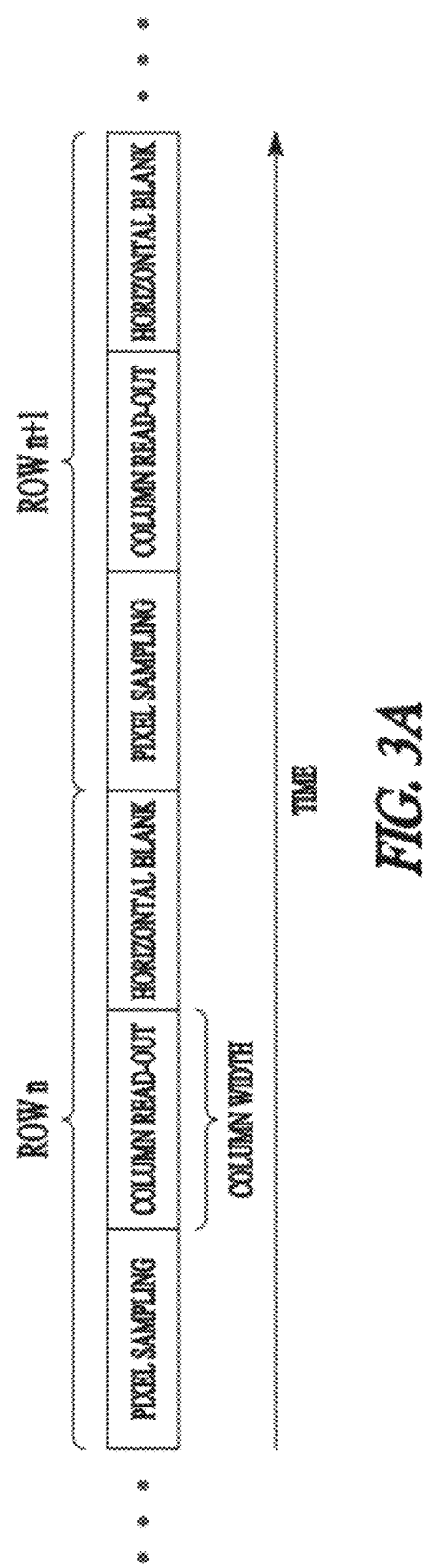
FIGS. 3A-C illustrate charge related signals for APS cells according to embodiments of the invention.

FIG. 3A illustrates a timing diagram for an array of APS cells according to embodiments of the invention. In the embodiment shown in FIG. 3A, the time to scan a sequential row of APS cells may be expressed as $$t_{row} = (t_{sampling} + t_{read\text{-}out} \times \text{column\_width} + t_{Horizontal\_blank}),$$

where $t_{sampling}$ is the time to sample an accumulated pixel charge in the floating diffusion region 118 (using a column sampling capacitor), $t_{read\text{-}out}$ is the time to readout an entire row of pixel charge stored in the column sampling capacitor, column_width is the number of pixel rows in a specified column, and $t_{Horizontal\_blank}$) is the interval time that may be included to ensure a proper frame rate. The frame time is the inverse of the frame rate that may be expressed as $$t_{frame} = (t_{row} \times \text{row\_height} + t_{Vertical\_blank}),$$

where row_height is the number of pixels column in a specified row, and $t_{Vertical\_blank}$ is the interval time that may be included to ensure a proper frame rate. In some embodiments, the sampling can be performed during a blanking time interval.

Figure 3B:
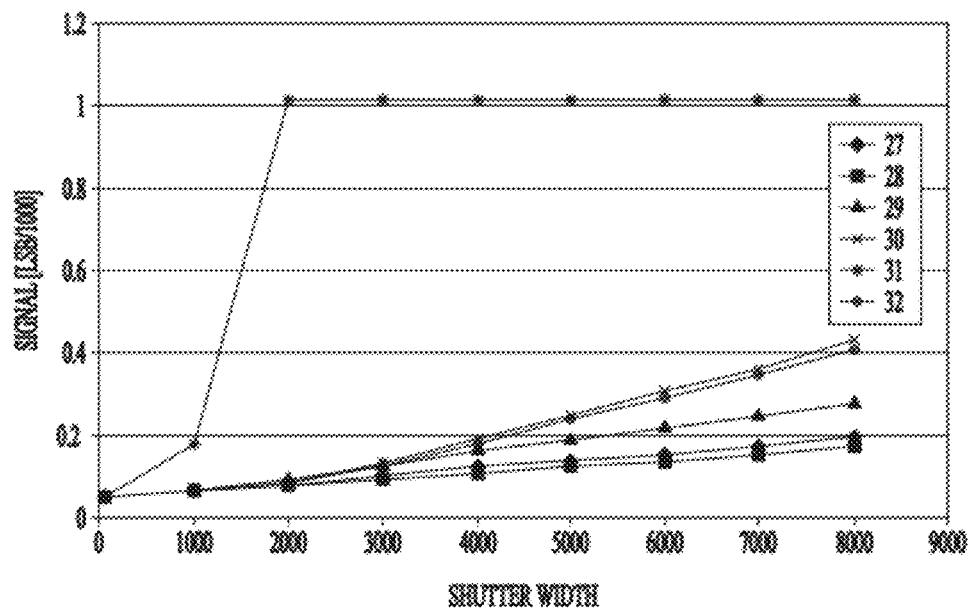

FIG. 3B illustrates charge related signals for an APS cell 110 according to embodiments of the invention. Here, the total charge collected in the floating diffusion region potential well is recorded for six pixels as a function of integration time (shutter width in rows). The time ($t_{row}$) is proportional to the number of rows of pixels scanned. The pixel pitch, which is the sum of the widths of the photogate 116 and the transfer gate region 119 along the direction of the scan is 1.7 um. The signal for pixels 27-32 is linear out to 1050 rows, at which point the signal for pixel 31 rapidly increases until reaching saturation at near row 2000. Pixel 31 is illustrative of a hot pixel. The rate change in the signal for pixel 31 can be attributed to charge carriers scattering from the floating diffusion region potential well to the photosensitive region potential well containing the accumulating photogenerated charge carrier (for example, shown as 245A in FIG. 2A). At row 1050, the charge signal for the adjacent pixels 27-30 and 32 also increases at a more rapid rate. At row 2000, the point where the charge signal for pixel 31 has reached saturation, the signals for adjacent pixels 27-30 and 32 show further increases in slope. The further slope changes for pixels 27-30 and 32 may be associated with the charge carriers for pixel 31 scattering into the photosensitive region potential wells of the respective adjacent pixels. This behavior is illustrative of a blooming charge.

Figure 3C:
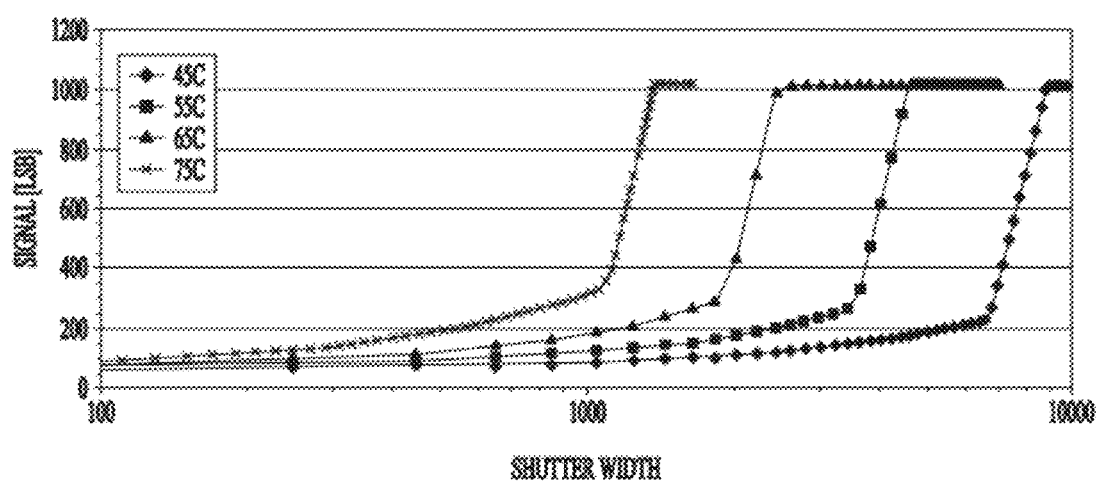

FIG. 3C illustrates charge related signals for an APS cell 110 according to various embodiments of the invention. Here, the total charge collected in the floating diffusion region potential well is recorded for pixel 31 (of FIG. 3B) as a function of the shutter width at four different pixel temperatures. As illustrated, the rate change in the charge signal for pixel 31 increases earlier and reaches saturation faster as the pixel temperature increases. The change in rate and the onset of saturation with pixel temperature may be attributed to the rate extraneous charge carriers fill the potential well 136 of the floating diffusion region 118. As explained and illustrated above, extraneous charge carriers accumulating in the floating diffusion potential well with an energy at or above the transfer gate potential barrier are able to scatter or otherwise transfer to the photosensitive region potential well (for example, 245A of FIG. 2A). The extraneous charge carriers flowing into the photosensitive region potential well may be considered as a dark current creating the effect of a hot pixel. The charge related to the dark current may be referred to as a blooming charge.

The dark current of a photosensitive region of an APS cell 110 may be approximated as $$I_{dark\_PD} = Io \; \exp^{q(I_{dark\_FD} T_{INT} CG - \phi s)/KT},$$

where $I_{dark\_FD}$ is the dark current in the floating diffusion region 118, $T_{INT}$ is the integration time, CG is the conversion gain, KT is a unit of thermal energy, and $\phi s$ the semiconductor built-in potential that depends on the Femi level. The relationship between the dark current in the photosensitive region and the integration time may therefore be expressed as $$\ln(I_{dark\_PD}) \propto T_{INT}.$$

Although longer integration times, in general, allow more light to be photogenerated as charge carriers, longer integration times also increase the dark current that includes blooming electrons escaping the floating diffusion region potential well 136. An anti-blooming feature may comprise a plurality of potential barriers and a plurality of potential wells configured to reduce, inhibit, block or otherwise prevent charge carriers from entering the photosensitive region potential well 132 from the floating diffusion region 136. Reducing, inhibiting, blocking, and otherwise preventing charge carriers from escaping to the photosensitive region potential well 132 may decrease the dark current and reduce noise. An anti-blooming feature incorporated into the APS cell may limit or even prevent extraneous charge carrier flow, leading to enhanced image quality.

Figure 4:
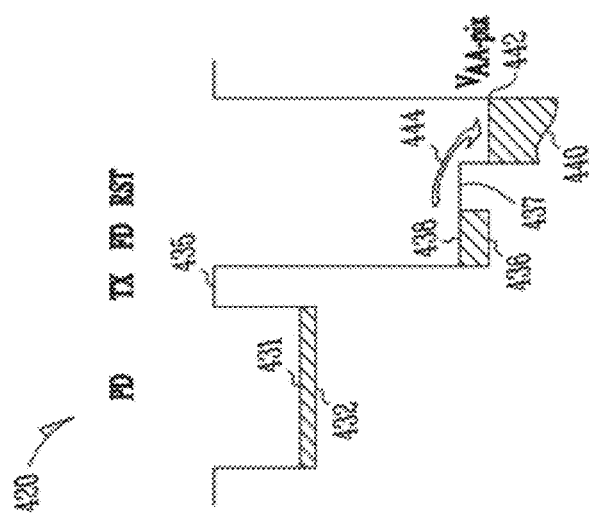
FIG. 4 illustrates a potential diagram of an APS cell according to various embodiments of the invention.

FIG. 4 illustrates an energy band diagram of an APS cell 110 according to various embodiments of the invention. Energy band diagram 420 illustrates the electronic state an APS cell 110 during an integration time using an anti-blooming feature. Here, the height of the reset potential barrier 437 is reduced by a voltage signal applied to the reset gate 124 during the length of the integration time. The lower potential barrier 437 permits charge carriers to flow continuously to the drain potential well 440. The drain potential well 440 may be configured to maintain a substantially constant charge carrier energy level at 442 using voltage $V_{AA\text{-}pix}$ as a charge carrier sink. Latch-type row drivers may be used, for example, to supply the voltage signals to maintain the on-state condition during the integration time. The height of the reset potential barrier 437 substantially limits the energy of extraneous charge carriers accumulating in the floating diffusion region potential well 436 to potential level 438. The charge carriers (shown as 444) at potential level 438 are unable to attain enough energy to cross the transfer gate potential barrier 435 into the photosensitive region potential well 432 to mix with the accumulating photogenerated charge carriers at potential level 431. The charge carriers in potential well 432, therefore, more accurately reflect the charge carrier population generated using the light from the object to be imaged. In some embodiments, voltage $V_{AA\text{-}pix}$ is a voltage ranging from about 1.2V to about 3.5V. In some embodiments, voltage $V_{AA\text{-}pix}$ may be 2.8V. In various embodiments, the reset gate voltage signal during the integration time may range from about 0 to about 3V. In some embodiments, the floating diffusion region voltage signal may range from about 1V to about 3V during the integration time. In various embodiments, the floating diffusion region voltage signal may range from about 1.5V to about 2.8V during the integration time. In some embodiments, the transfer gate potential ranges from about 0V to about 0.7V during the integration time. In various embodiments, the potential barrier 435 and/or the potential barrier 437 may be adjusted to provide specified barrier heights. In some embodiments, the potential barrier 435 and the potential barrier 437 may be adjusted to provide a desired barrier height differential to direct charge carriers away from the photosensitive region potential well 432.

Figure 5:
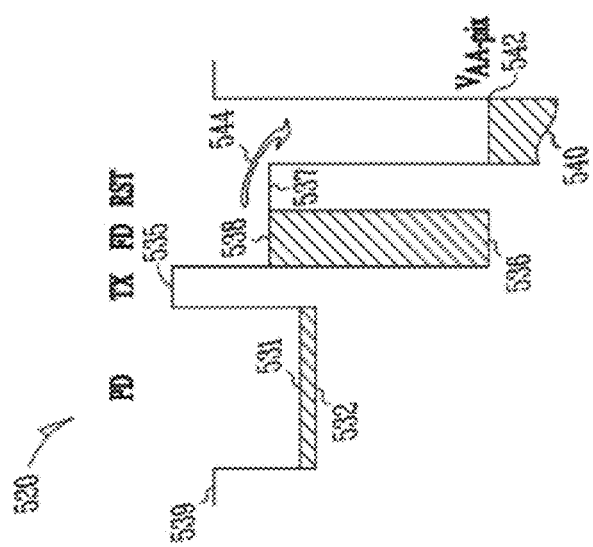
FIG. 5 illustrates a potential diagram of an APS cell according to various embodiments of the invention.

FIG. 5 illustrates a potential diagram of an APS cell 110 according to various embodiments of the invention. Potential diagram 520 illustrates the electronic state an APS cell 110 during a signal integration time using an anti-blooming feature. Here, the height of the reset potential barrier 537 is reduced by a dopant atom profile introduced into the reset gate region 123. In some embodiments, the reset gate potential barrier 537 may be formed by adjusting a dopant atom profile in reset gate region 123. A voltage signal may be applied to the reset gate 124 to further adjust the height of the reset potential barrier 537. The lower potential barrier 537 permits the charge carriers to flow continuously to the drain potential well 540 during the integration time. The drain potential well 540 may be configured to maintain a substantially constant charge carrier at potential level 542 using voltage $V_{AA\text{-}pix}$ as a charge carrier sink. The potential barrier 537 substantially limits the energy of the extraneous charge carriers in the floating diffusion region potential well 536 to at or below potential level 538. Extraneous charge carriers attaining energy exceeding potential level 538 during the integration time are able to flow across barrier 537 to drain potential well 540. Upon falling into the drain potential well 540, the extraneous charge carriers lack sufficient energy to return to the potential well 536.

The height of the transfer gate potential barrier 535 may be adjusted using a dopant atom profile introduced into the transfer gate region 119. In various embodiments, the transfer gate potential barrier 535 may be formed by adjusting a dopant atom profile in the transfer gate region 119. In some embodiments, the height of the potential barrier 535 is adjusted to be higher than the potential level at 539 located adjacent to the photogate 116 using a doping profile. In various embodiments, the height of the potential barrier 535 may be adjusted to be less than the potential level at 539 using a doping profile. A voltage signal may be applied to the transfer gate 120 to further adjust the height of potential barrier 535. The higher potential of barrier 535 during the integration time assists the extraneous charge carriers in flowing to the drain potential well 540. The higher potential of the barrier 535 further assists in blocking the transfer of extraneous charge carriers from entering the potential well 532. The extraneous charge carriers exceeding the potential level 538 are reflected back to potential well 536 or to potential well 540 by the potential barrier 535. The charge carriers at potential level 538 are unable to attain enough energy to cross the potential barrier 535 into the potential well 532 to mix with the accumulating photogenerated charge carriers at potential level 531. The charge carriers in potential well 532, therefore, more accurately reflect the charge carrier population generated using the light from the object to be imaged.

In some embodiments, the impurity profiles may be adjusted in the reset gate region 123 and the transfer gate region 119 such that the respective potential barriers are formed to cooperatively reflect and direct the extraneous charge carriers away from potential well 532. In various embodiments, the potential barrier 537 may be further adjusted by a reset gate voltage signal ranging from about 0V to about 2V during the integration time. In an embodiment, the reset gate voltage signal may be about 0.7V during the integration time. In some embodiments, the barrier potential 535 may be further adjusted by a transfer gate voltage signal ranging from about −1V to about 2V during the integration time. In an embodiment, the transfer gate voltage signal may be about −0.3V during the integration time. In some embodiments, the potential well 536 may be adjusted by a voltage applied to the floating diffusion region 118 ranging from about 0V to about 3V during the integration time. In various embodiments, the potential well 532 may be adjusted by a voltage signal applied to the photogate 116 ranging from about 0 V to about 3V during the integration time. In various embodiments, voltage $V_{AA\text{-}pix}$ is a voltage ranging from about 1.2V to about 3.5V. In some embodiments voltage $V_{AA\text{-}pix}$ may be 2.8V.

Figure 6:
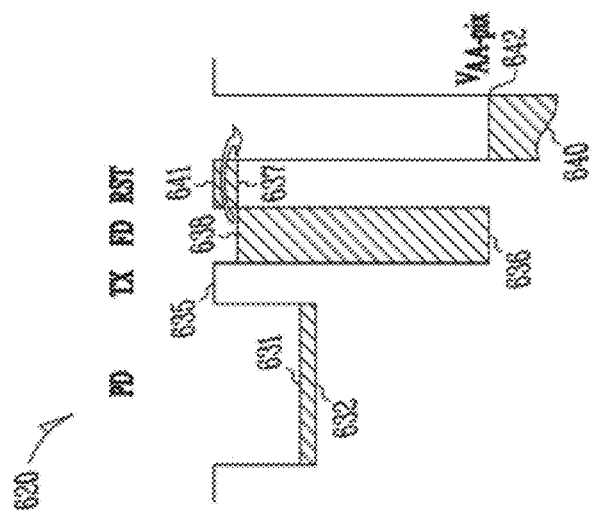
FIG. 6 illustrates a potential diagram of an APS cell according to various embodiments of the invention.

FIG. 6 illustrates an potential diagram of an APS cell 110 according to various embodiments of the invention. Energy band diagram 620 illustrates the electronic state of an APS cell 110 during an integration time using an anti-blooming feature. Here, the reset gate region 123 may be processed to include a region of electronic states, such as fast surface states. The transfer gate region 119 may be formed to include substantially bulk semiconductor states. In the region with electronic states, the leakage current may be greater than in a similar region with bulk semiconductor states. The electronic states may form in-band electronic states at some energy below the bulk band gap energy. In-band electronic states included in the reset gate region 123 may form a conduction path between the floating diffusion region 118 and the drain potential well. This may be modeled as a leaky reset gate 124 with a reduced barrier potential 641 in the reset gate potential barrier 637. Extraneous charge carriers in the potential well 636 at or near the reduced gate potential barrier 641 may flow across and fall into the drain potential well 640. Upon reaching the drain potential well 640, the extraneous charge carriers lose energy and are unable to transfer back to the potential well 636. The drain potential well 640 may be configured to maintain a substantially constant charge carrier potential level at 642 using voltage $V_{AA\text{-}pix}$ as a charge sink. Since the extraneous charge carriers transfer to the drain potential well 640 upon reaching potential level 638, they are unable to attain enough energy to cross the potential barrier 635 well into potential well 632. The charge carriers at less than or equal to the potential level 631 in potential well 632, therefore, more accurately reflect the charge carrier population generated using the light from the object to be imaged.

In some embodiments, an impurity such as a p-type dopant may be used for forming a region including in-band electronic states. In various some embodiments, an n-type dopant may be used for forming a region including in-band electronic states. In some embodiments, n-type and p-type dopants may be included to form a region including in-band electronic states. In some embodiments, a dielectric in combination with an impurity profile may be used to form a region including in-band electronic states. In various embodiments, an impurity may be included in a dielectric used to form a reset gate region 123 including in-band electronic states.

Figure 7A:
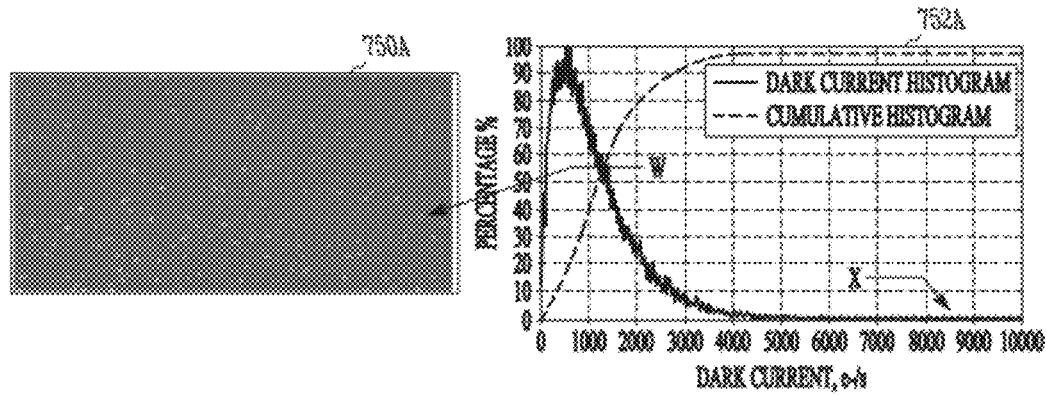
FIG. 7A-C illustrate imaging data acquired by an array of silicon APS cells according to various embodiments of the invention.

FIG. 7A illustrates imaging data acquired with an array of silicon APS cells according to the various embodiments of the invention. Histogram 752A illustrates an image 750A formed using charge carriers photogenerated in a substantially dark environment. The total dark current for the silicon APS cells is recorded with the image 750A formed at point X. Here, the APS cells are operating as illustrated in FIGS. 2A-C. The bright spots (for example, point W) appearing against the otherwise black background as noise are due to the extraneous charge carriers mixing with the photogenerated carriers in a potential well (for example, 232A) during the integration time. Shown in image 750A is an illustration of a hot pixel effect.

Figure 7B:
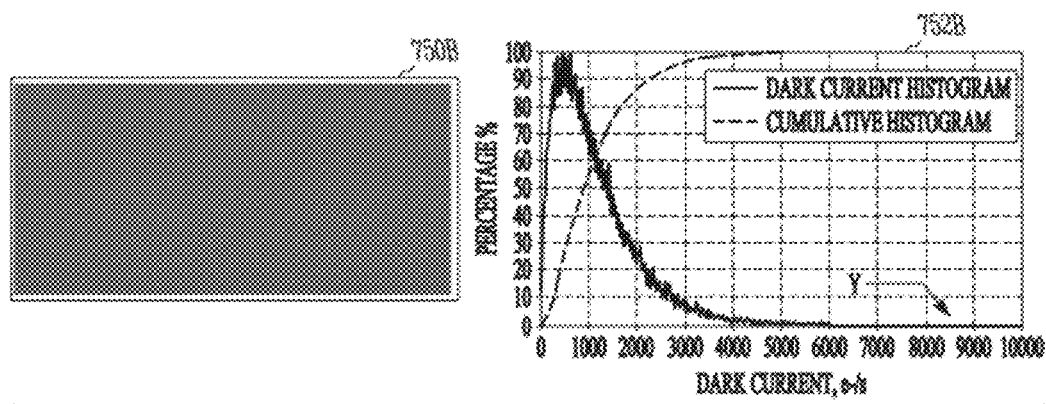

FIG. 7B illustrates imaging data acquired with an array of silicon APS cells according to various embodiments of the invention. Histogram 752B illustrates an image 750B formed using charge carriers photogenerated in a substantially dark environment. The total dark current for the silicon APS cells is recorded with image 750B formed at point Y. Here, the APS cells are operating as illustrated in FIG. 4. The histogram 752B indicates an absence of a dark current tail at above 6000 electrons per second. At point Y of the histogram, few counts can be detected and few bright spots can be perceived against the otherwise black background. The lack of bright spots indicates that extraneous charge carriers do not mix with the photogenerated charge carriers in the potential well 432 during the integration time. The extraneous charge carriers, therefore, do not contribute to the pixel dark current. Shown in image 750B is an illustration of a reduced hot pixel effect using the anti-blooming feature illustrated in FIG. 4 that may improve image quality.

Figure 7C:
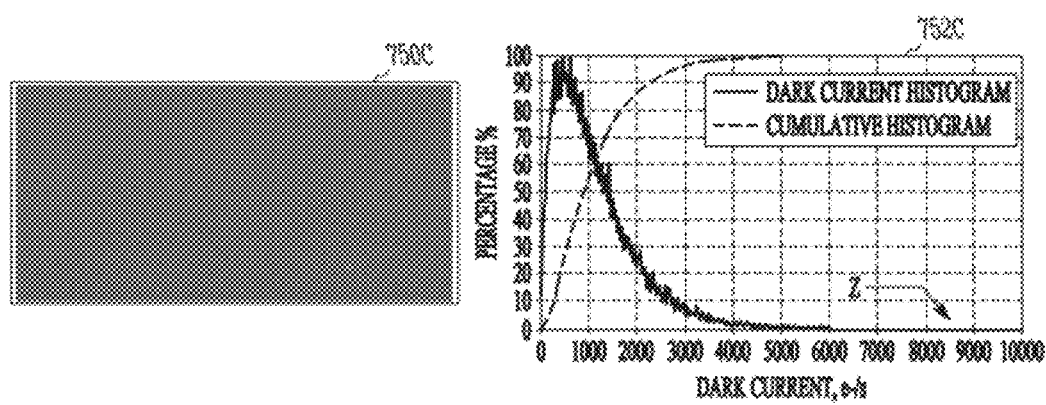

FIG. 7C illustrates imaging data acquired with an array of silicon APS cells according to various embodiments of the invention. Histogram 752C illustrates an image 750C formed using charge carriers photogenerated in a substantially dark environment. The total dark current for the silicon APS cells is recorded with image 750C formed at point Z. Here, the APS cells are operating as illustrated in FIG. 5 with the reset gate voltage at 0.7V during the integration time. Histogram 752C indicates an absence of a dark current tail at above 6000 electrons per second At point Z of the histogram, few counts can be detected and few bright spots can be perceived against the otherwise black background. The lack of bright spots in the image indicates that extraneous charge carriers do not mix with the photogenerated charge carriers in the potential well 532 during the integration time. The extraneous charge carriers, therefore, do not contribute to the pixel dark current. Shown in image 750C is an illustration of a reduced hot pixel effect using the anti-blooming feature illustrated in FIG. 5 that may improve image quality.

Figure 8:
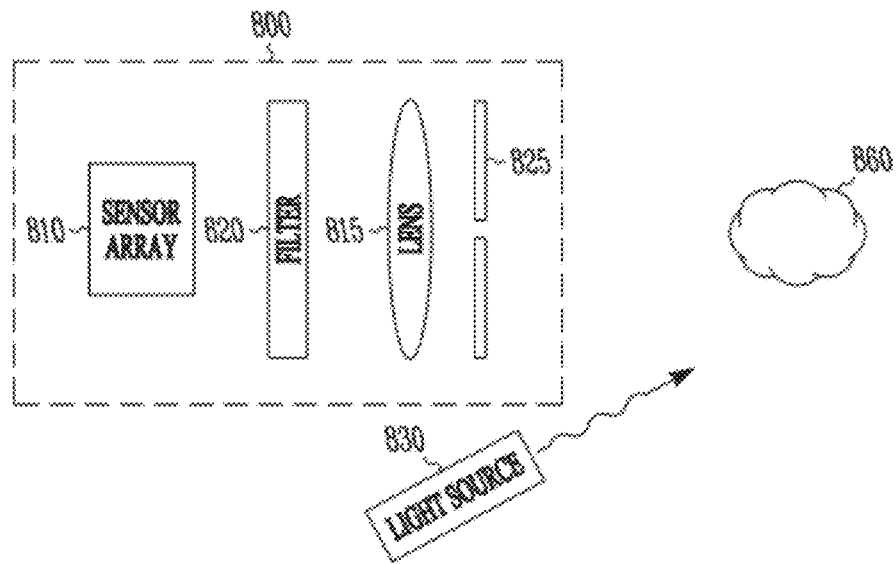
FIG. 8 illustrates an imaging apparatus according to various embodiments of the invention.

FIG. 8 illustrates an imaging apparatus 800 according to various embodiments of the invention. The imaging apparatus 800 may include a sensor array 810 configured to receive light from an object 860 through the lens 815. The light received from the object 860 may be used to reconstruct an image of the object 860 to form a picture. The reconstructed image of the object 860 may be formed using light having one or more wavelengths. For example, the image may represent portions of the object 860 emitting, reflecting, or transmitting one or more colors, such as red, green, and blue. The object 860 may be illuminated from any angle or side, including back illumination. In some embodiments the object 860 may be self illuminating or self emitting such as from heat emissions. Examples of images include automobiles, automobile tail lights, head lights and directional signals and the like, aircraft, sea vessels, landscape and terrain, traffic signals and signs, humans, animals, solar matter, pharmaceuticals, bacteria, viruses, genetic material, and other images observable using light. Examples of self illuminating and self emitting objects include objects having exhaust heat, thermals emissions, black body radiation, ovens, motors, generators, power plants, exothermic reactions such as fermentation processes, chemical reactions and concrete curing processes, and other objects emitting electromagnetic radiation in the form of heat. Imaging apparatus 800 may be attached to a movable mount or mechanical pivot (not shown) such as a gimbal. The pivot may be coupled to processor (not shown) to specify coordinates, angles and direction of orientation of the lens 815, aperture 825, or sensor array 810. The light source 830 may be used to illuminate the image. The light source 830 may be operatively coupled to a controller that is coupled to the sensor array 810.

The light source 830 may be used to illuminate an object 860 or to enhance image contrast. The light source 830 may comprise a coherent light source, an incoherent source such as a broadband light source or a narrow band light source, or a combination of coherent and incoherent light sources. In some embodiments, the light source 830 may be used to illuminate a portion of an object 860 that is imaged. In various embodiments, the wavelength of the light source 830 may be selected to match an absorption property of the object 860. In some embodiments, an image of object 860 may be formed using light transmitted through the object. In various embodiments, an image of object 860 may be formed using light not absorbed by the object 860. Examples of light sources include, without limitation, a LASER (light amplification by stimulated emission radiation), a light emitting diode, a black body source such as the sun, starlight, moonlight, a thermal source, an incandescent light source, a halogen light source, and a fluorescent light source. The sensor array 810 may include a linear array of sensor elements or a two-dimensional array of sensor elements. The sensor array 810 may include one or more APS cells constructed and operating according to various embodiments to the invention, as shown in FIGS. 1, 2, 4-6. In various embodiments, the sensor elements in a sensor array 810 are partitioned according to a position within the sensor array. In some embodiments, the sensor elements may be partitioned according to wavelength. In some embodiments, the lens 815 may comprise a plurality of lenses. In various embodiments, the lens 815 may comprise an array of lenses. The imaging apparatus 800 may include a sensor array 810 configured to receive light through a filter 820 and/or aperture 825. The aperture 825 may be operatively coupled to the sensor array 810 using a controller (not shown). In various embodiments, the aperture 825 may comprise an electronic aperture configured to reduce the amount of light received by the sensor array 810. In some embodiments the aperture 825 may comprise a shutter. The sensor array 810, the lens 815, the filter 820, and the aperture 825 may be formed as an integrated module. In some embodiments, combinations of the sensor array 810, the lens 815, the filter 820, and the aperture may be formed as an integrated module. It is to be understood the order of assembly of the lens 815, filter 820, and the aperture 825 are shown for conceptual purposes and are not limited to the positions shown in FIG. 8 and may adjusted according to the specific application of interest.

Figure 9:
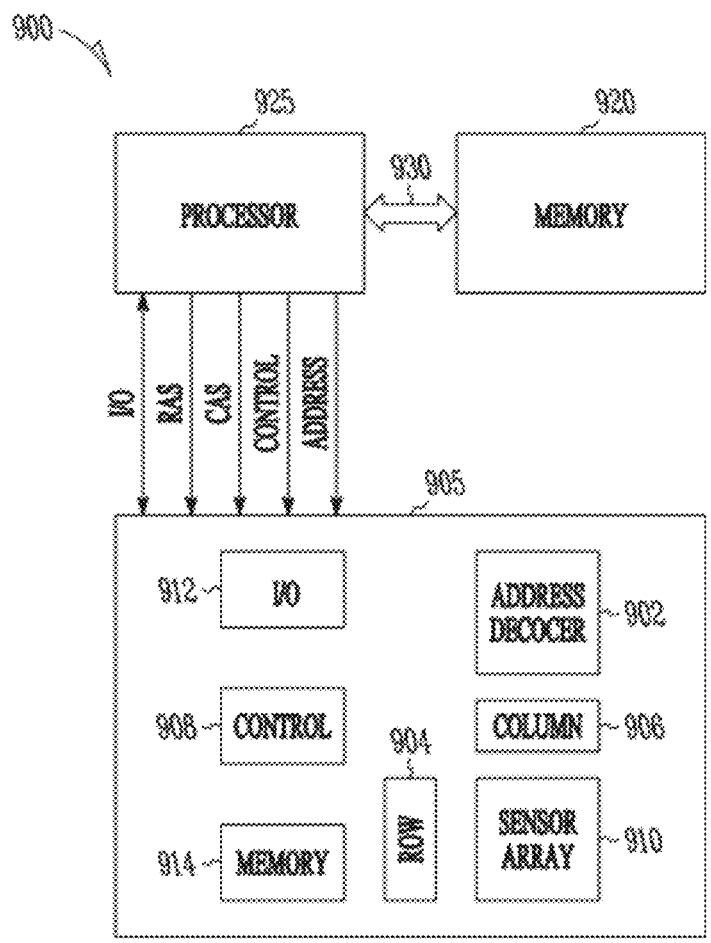
FIG. 9 is block diagram of an imaging device according to various embodiments of the invention.

FIG. 9 is block diagram of an imaging device 900 according to various embodiments of the invention. The imaging device 900 may comprise processor 925, memory 920, and an imaging module 905. The processor 925 may be operatively coupled to memory 920 by a bus 930. Imaging module 905 may comprise a sensor array 910, an address decoder 902, row access circuitry 904, column access circuitry 906, control circuitry 908, input/output (I/O) circuit 912, and memory 914. The imaging module 905 may comprise one or more APS cells (as shown in FIG. 1) operatively coupled to the row access circuit 904 and to the column access circuit 906. The imaging device 900 may be operatively coupled to processor 925 or a controller (not shown) to provide control signals to the imaging module 905 to access signal content. The imaging module 905 is shown to receive control signals from the processor 925, such as column and row address enable signals CAS and RAS, respectively. The processor 925 may transmit address signals to the imaging module 905 specifying the APS cell to be read, reset, or allowed to integrate. Control signals such as reset gate signals, transfer gate signals, floating diffusion signals, photogate signals, and signals to null-out extraneous charge carrier contribution to the photogenerated carriers may be provided to the imaging module 905 by the processor 925. The memory device 920 may store data provided to the processor 925 from the imaging module 905. Memory 914 may store data related to an imaged object acquired by the sensor array 910. It will be appreciated by those of ordinary skill in the art that additional circuitry and control signals can be provided and that the imaging device of FIG. 9 has been simplified to help clarify, and not obscure, various embodiments of the invention. Any of the sensor array 910 include an integrated circuit structure and/or elements in accordance with various embodiments of the invention. For example, the sensor array 910 may be fabricated to include one or more potential barriers and potential wells adjusted to store, block, transmit, and remove photogenerated charge carriers and to transmit, block, and remove extraneous charge carriers, as shown in FIGS. 1, 2, 4-6.

It should be understood that the above description of a imaging device 900 is intended to provide a general understanding of possible imaging structures and is not a complete description of all the elements and features of a specific type of imaging device, including APS cells. Further, many embodiments of the invention are equally applicable to any size and type of imaging module 905 and are not intended to be limited to the APS cells described above.

Figure 10:
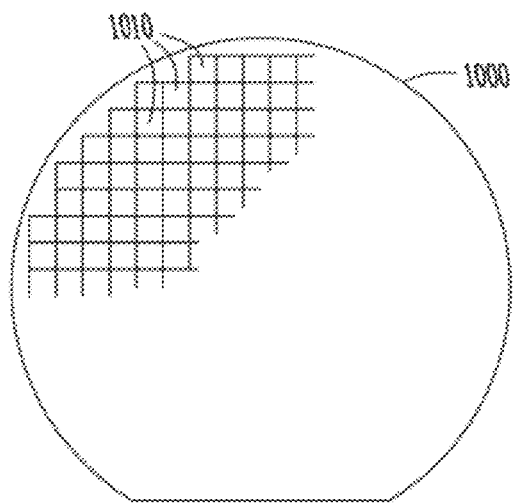
FIG. 10 illustrates a semiconductor die, according to an embodiment of the invention.

FIG. 10 illustrates a semiconductor wafer 1000 according to various embodiments of the invention. As shown, a semiconductor die 1010 may be produced from a wafer 1000. The semiconductor die 1010 may be individually patterned on a substrate layer or wafer 1000 that contains circuitry, or integrated circuit devices, to perform a specific function. The semiconductor wafer 1000 may contain a repeated pattern of such semiconductor dies 1010 with the same functionality. The semiconductor die 1010 may be packaged in a protective casing (not shown) with leads extending therefrom (not shown), providing access to the circuitry of the die for unilateral or bilateral communication and control. The semiconductor die 1010 may include an integrated circuit structure or element in accordance with many of the various embodiments of the invention, including one or more APS cells, as shown in FIGS. 1, 2, 4-6.

Figure 11:
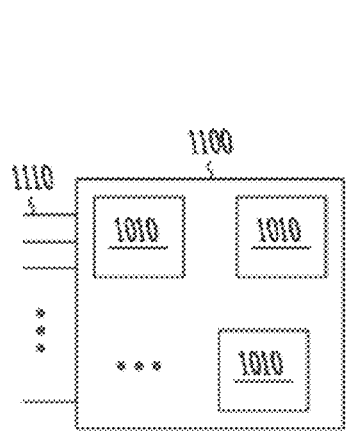
FIG. 11 illustrates a circuit module according to various embodiment of the invention.

FIG. 11 illustrates a circuit module 1100 according to various embodiment of the invention. As shown in FIG. 10, two or more semiconductor dice 1010 may be combined, with or without a protective casing, into a circuit module 1100 to enhance or extend the functionality of an individual semiconductor die 1010. The circuit module 1100 may comprise a combination of semiconductor dice 1010 representing a variety of functions, or a combination of semiconductor dice 1010 containing the same functionality. One or more semiconductor dice 1010 of circuit module 1100 may contain at least one integrated circuit structure or element in accordance with embodiments of the invention, including one or more APS cells, as shown in FIGS. 1, 2, 4-6.

Some examples of a circuit module 1100 include imaging modules, memory modules, sensor modules, device drivers, power modules, communication modems, processor modules, and application-specific modules and may include multilayer, multichip modules. The circuit module 1100 may be a subcomponent of a variety of electronic systems, including the system 1300 described below. The circuit module 1100 may have a variety of leads 1110 extending therefrom and coupled to the semiconductor dice 1010 providing unilateral or bilateral communication and control.

Figure 12:
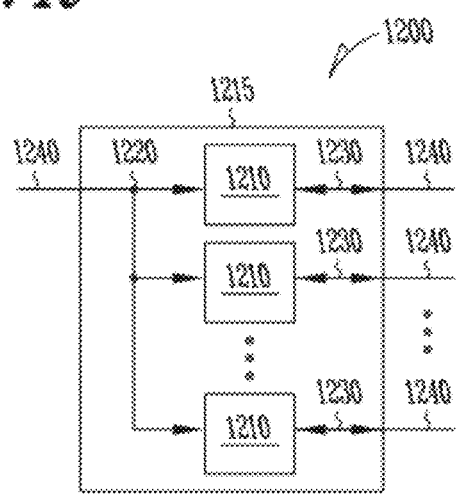
FIG. 12 illustrates a circuit module as an imaging module according to various embodiment of the invention.

FIG. 12 illustrates a circuit module as an image module 1200, according to various embodiments of the invention. The image module 1200 may include multiple imaging devices 1210 contained on a support 1215. The image module 1200 may accept a command signal from an external controller (not shown) on a command link 1220 and provide for data input and data output on data links 1230. The command link 1220 and data links 1230 may be connected to leads 1240 extending from the support 1215. The leads 1240 are shown for conceptual purposes and are not limited to the positions shown in FIG. 12. At least one of the imaging devices 1210 may contain an integrated circuit structure or element in accordance with embodiments of the invention, including one or more APS cells, as shown in FIGS. 1, 2, 4-6.

Figure 13:
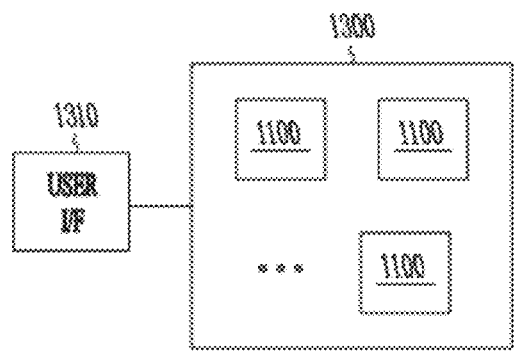
FIG. 13 is a block diagram illustrating an electronic system according to various embodiment of the invention.

FIG. 13 illustrates a block diagram of an electronic system 1300 according to various embodiment of the invention. FIG. 13 shows an electronic system 1300 containing one or more circuit modules 1100. The electronic system 1300 may include a user interface 1310 that provides a user of the electronic system 1300 with some form of control or observation of the results generated by the electronic system 1300. Some examples of a user interface 1310 include a keyboard, pointing device, monitor or printer of a personal computer, tuning dial, display, gauge, card reader, keypad, fingerprint scanner, iris scanner, bar code scanners, as well as other human-machine interfaces. Further examples of systems 1300 include a camera, a television, a cell phone, a personal computer, an automobile, an industrial control system, an aircraft, a robot, an automated control system, a medical diagnostics instrument, analytical instrumentation, and others.

The user interface 1310 may further include access ports provided to electronic system 1300. Access ports are used to connect an electronic system 1300 to the more tangible user interface components previously provided by way of example. One or more of the circuit modules 1100 may comprise a processor providing some form of manipulation, control or direction of inputs or outputs to the user interface 1310, or of other information either preprogrammed into or otherwise provided to the electronic system 1300. As will be apparent from the lists of examples previously given, the electronic system 1300 may be associated with certain mechanical components (not shown) in addition to the circuit modules 1100 and the user interface 1310. It should be understood that the one or more circuit modules 1100 in the electronic system 1300 can be replaced by a single integrated circuit. Furthermore, the electronic system 1300 may be a subcomponent of a larger electronic system. It should also be understood by those of ordinary skill in the art, after reading this disclosure, that at least one of the circuit modules 1100 may contain an integrated circuit structure or element in accordance with embodiments of the invention, including one or more APS cells, as shown in FIGS. 1, 2, 4-6.

Figure 14:
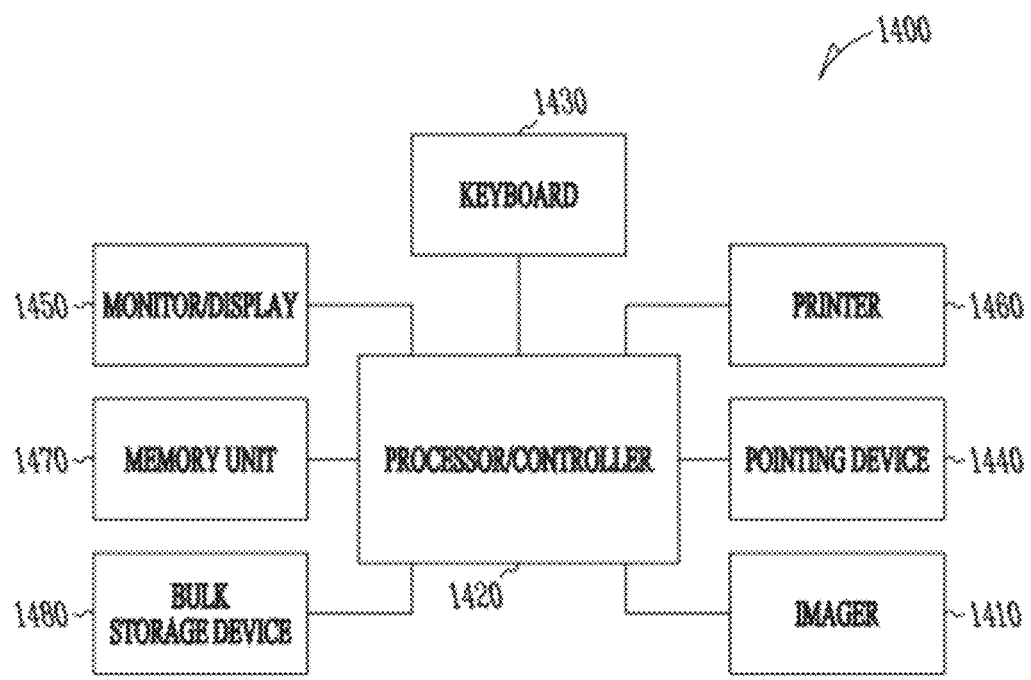
FIG. 14 is a block diagram illustrating an optical imaging system according to various embodiments of the invention.

FIG. 14 illustrates a block diagram of an imaging system 1400, according to one embodiment of the invention. An imaging system 1400 may include, an optical imager 1410 and a processor/controller 1420. The imaging system 1400 also serves as an example of an electronic system containing another electronic system, i.e., optical imager 1410, as a subcomponent. The imaging system 1400 optionally contains user interface components, such as a keyboard 1430, a pointing device 1440, a monitor/display 1450, a printer 1460, a memory unit 1470 such as a dynamic random access memory, and a bulk storage device 1480. Other components associated with imaging system 1400, such as modems, device driver cards, additional storage devices, etc. may also be included. The optical imager 1410, the memory unit 1470, and the processor 1420 may be incorporated on a single integrated circuit. Such single package processing units may operate to reduce image processing time and costs. The optical imager 1410 may contain APS cells, as shown in FIG. 1. In some embodiments, the APS cells may contain a structure or element in accordance with embodiments of the invention, including one or more potential barriers and potential wells adjusted to store, block, transmit, and remove photogenerated charge carriers and to transmit, block, and remove extraneous charge carriers, as shown in FIGS. 2, 4-6. Examples of imaging system 1400 comprising an optical imager 1410 that may incorporate APS cells according to the various embodiments of the invention include automobile motion sensor systems, security systems, surveillance systems, digital radiography systems, mammography systems, dental imaging systems, glucose monitoring systems, pulse oximetry systems, digital photography systems, hand-held communication systems, robotic systems, machine vision systems, aircraft systems, night vision systems, fluorescence systems, chemiluminescence systems, thermal imaging systems, as well as other systems that sense, detect, or use reflected, transmitted, or absorbed electromagnetic energy to form an image.

The above Detailed Description includes references to the accompanying drawings, which form a part of the detailed description. The drawings show, by way of illustration, specific embodiments. These embodiments, which are also referred to herein as "examples," are described in enough detail to enable those skilled in the art to practice the invention. The embodiments may be combined, other embodiments may be utilized, or structural, logical, and electrical changes may be made without departing from the scope of the present invention. The Detailed Description is, therefore, not to be taken in a limiting sense and the scope of the various embodiments is defined only by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

As used herein, the "integration time" is the time interval (or the period of time) the photogenerated charge carriers are allowed to accumulate in the photosensitive region potential well (e.g., potential well 131 of FIG. 1).

It is to be understood that the above description is intended to be illustrative and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A pixel sensor, comprising:
a plurality of light conversion regions, each light conversion region having dopants disposed in the respective light conversion region according to a first dopant profile, the respective light conversion region having a first potential barrier based on the first dopant profile, the first potential barrier having a first height;
a plurality of charge carrier blocking regions, each one of the plurality of charge carrier blocking regions operatively coupled and adjacent to one of the plurality of light conversion regions, each charge carrier blocking region having dopants disposed in the respective charge carrier blocking region according to a second dopant profile, the adjacent light conversion region having a second potential barrier opposite the first potential barrier, the second potential barrier having a second height based on the second dopant profile, the second height being greater than the first height;
a plurality of charge removal regions, each charge removal region having a structure to trap charge carriers in conjunction with an arrangement of the structure with a respective charge carrier blocking region of the plurality of charge carrier blocking regions, the structure arranged to operatively transfer the charge carriers to at least one potential well with an energy above a specified threshold potential.

2. The pixel sensor of claim 1, wherein the plurality of light conversion regions, the plurality of charge carrier blocking regions, and the plurality of charge removal regions are disposed in a semiconductor region comprising one or more of SiC, SiGeC, GaAs, AlAs, AlGaAs, InP, InGaAs, InAs, ZnSe, ZnS, GaN, GaP, AlP, AlGaP, AlAsP, GaAsP, InAsP, AlGaN, AN, AlInAs, GaInN, GaAsN, GaPN, AlGaAsP, AlGaInAsP, or AlGaInAsPN.

3. The pixel sensor of claim 2, wherein the semiconductor region is lattice matched to a substrate on which it is disposed.

4. The pixel sensor of claim 1, wherein the plurality of charge removal regions includes a potential energy barrier with in-band electronic states configured to couple the charge carriers to a charge carrier sink.

5. The pixel sensor of claim 1, wherein at least one of the plurality of light conversion regions is configured to receive light passing through at least one of a shutter, a filter, or a lens.

6. The pixel sensor of claim 1, wherein at least one of the plurality of light conversion regions has absorption properties to absorb light having a plurality of wavelength bands.

7. The pixel sensor of claim 1, wherein the pixel sensor includes:
a substrate on which the light conversion regions are disposed; and
for each light conversion region, a filter layer on a side of the substrate opposite the respective light conversion region.

8. The pixel sensor of claim 1, wherein the plurality of charge blocking regions are configured to block charge carriers generated outside the plurality of light conversion regions.

9. The pixel sensor of claim 1, wherein the plurality of light conversion regions has absorption properties to absorb light associated with heat.

10. The pixel sensor of claim 1, wherein the plurality of light conversion regions is configured to receive light passing through at least one of a shutter, a filter, or a lens and the plurality of light conversion regions has absorption properties to absorb light associated with heat.

11. The pixel sensor of claim 1, wherein at least one of the plurality of light conversion regions has absorption properties to absorb light having a plurality of wavelength bands and the plurality of light conversion regions has absorption properties to absorb light associated with heat.

12. The pixel sensor of claim 1, wherein the plurality of light conversion regions are configured to store photogenerated charge carriers during a specified charge carrier accumulation time and the plurality of charge blocking regions are configured to block charge carriers generated outside the plurality of light conversion regions.

13. The pixel sensor of claim 1, wherein the pixel sensor includes a control operatively coupled to the light conversion regions, the charge carrier blocking regions, and the charge removal regions, the control arranged to control the direction of charge carriers away from the light conversion region.

14. The pixel sensor of claim 1, wherein the plurality of light conversion regions is configured to receive light passing through at least one of a shutter, a filter, or a lens and configured to store photogenerated charge carriers during a specified charge carrier accumulation time.

15. The pixel sensor of claim 1, wherein the plurality of light conversion regions has absorption properties to absorb light having a plurality of wavelength bands and configured to store photogenerated charge carriers during specified charge carrier accumulation time.

16. The pixel sensor of claim 1, wherein each light conversion region of the plurality of light conversion regions is disposed below a transparent photogate.

17. The pixel sensor of claim 1, wherein each light conversion region of the plurality of light conversion regions is disposed with a filter layer and an antireflection layer between the light conversion region and a transparent photogate to the respective light conversion region.

* * * * *